(12) United States Patent
Smith et al.

(10) Patent No.: US 7,457,678 B2
(45) Date of Patent: Nov. 25, 2008

(54) METHOD FOR MANAGING ERGONOMIC RISK EXPOSURE IN MANUFACTURING

(75) Inventors: David R. Smith, Woodinville, WA (US); Richard Jay Gardner, Brier, WA (US); Amy May, Seattle, WA (US); Chuck Eggleston, Granite Falls, WA (US); David Curtis Smith, Kirkland, WA (US); Andrea K. Pidduck, Lake Stevens, WA (US); Peter J. Gaul, Mukilteo, WA (US); John R. Amell, Kirkland, WA (US)

(73) Assignee: The Boeing Company, Irvine, CA (US)

( * ) Notice: Subject to any disclaimer, the term of this patent is extended or adjusted under 35 U.S.C. 154(b) by 261 days.

(21) Appl. No.: 11/557,236

(22) Filed: Nov. 7, 2006

(65) Prior Publication Data
US 2008/0109271 A1 May 8, 2008

(51) Int. Cl.
*G06F 19/00* (2006.01)
*G06F 9/44* (2006.01)
*G06F 17/50* (2006.01)

(52) U.S. Cl. ............................. 700/97; 705/7

(58) Field of Classification Search .................. 700/97; 705/7
See application file for complete search history.

(56) References Cited

U.S. PATENT DOCUMENTS

| 6,865,581 | B1 * | 3/2005 | Cloninger et al. ........ 707/104.1 |
| 6,931,387 | B1 * | 8/2005 | Wong et al. .................... 706/50 |
| 2002/0095417 | A1 * | 7/2002 | Gordon ....................... 707/10 |
| 2004/0210447 | A1 * | 10/2004 | Zingarelli ....................... 705/1 |
| 2005/0075970 | A1 * | 4/2005 | Doyle ........................... 705/38 |
| 2005/0075972 | A1 * | 4/2005 | Doyle ........................... 705/38 |
| 2006/0100897 | A1 * | 5/2006 | Halloran et al. ................. 705/1 |
| 2007/0106624 | A1 * | 5/2007 | Taylor et al. ................. 705/500 |
| 2007/0179648 | A1 * | 8/2007 | Taylor et al. .................. 700/90 |
| 2008/0126150 | A1 * | 5/2008 | Kaufman et al. ............... 705/7 |

* cited by examiner

*Primary Examiner*—Ronald D. Hartman, Jr.
(74) *Attorney, Agent, or Firm*—Weiss & Moy, P.C.

(57) ABSTRACT

A system and method of planning an operational task of a workplace collects data related to at least one task. An ergonomic risk score of each task is generated. A determination is made if the ergonomic risk score is acceptable. An option is provided to a user to proceed with the plan if the ergonomic risk score is acceptable. An option is provided to the user to redesign at least a portion of the plan.

18 Claims, 5 Drawing Sheets

ERGONOMICS RISK CHECKLIST

| IP Number: | Date: |
|---|---|

Please provide answers for ALL of the following SIX ergonomics risk factor questions as they apply to the work performed in the Installation Plan. Complete one checklist for each individual Manufacturing Technician for the duration of an entire IP. If actual weights, forces, durations, or counts are not available, please estimate the values as accurately as possible.

1) LIFTING

Fill in the fields below for each operation that requires manual lifting

POSTURES
OPTIMUM
MODERATE EXTENSION
FULL EXTENSION

TOTAL SCORE: 0.35

| POSTURE | WEIGHT (in pounds) | COUNT/DAY | SCORE |
|---|---|---|---|
| OPTIMUM | 45 | 31 | 0.24 |
| MODERATE EXTENSION | 20 | 60 | 0.11 |
|  |  |  |  |
|  |  |  |  |
|  |  |  |  |
|  |  |  |  |
|  |  |  |  |
|  |  |  |  |

2) HAND/ARM

Fill in the fields below for each operation that requires hand and/or arm forces

HAND GRIP / PINCH GRIP / HAND PRESS / HITCH HIKERS THUMB

TOTAL SCORE: 1.17

| TYPE | FORCE (in pounds) | COUNT/DAY | SCORE |
|---|---|---|---|
| HAND GRIP | 15 | 500 | 0.19 |
| PINCH GRIP | 6 | 200 | 0.40 |
| FINGER PRESS | 8 | 100 | 0.09 |
| THUMB PRESS | 12 | 400 | 0.48 |
|  |  |  |  |
|  |  |  |  |
|  |  |  |  |
|  |  |  |  |

Figure 3

| 3) OVERHEAD | | | TOTAL SCORE 0.00 |
|---|---|---|---|
| How many times are hands raised overhead during this IP? (Total Count): | | 0.00 | |
| How long are hands raised overhead during this IP? (Total Minutes): | | 0.00 | |

4) PUSH/PULL
Fill in the fields below for each operation that requires hand and/or arm pushing/pulling

TWO HAND HORIZONTAL   ONE HAND HORIZONTAL   ONE ARM VERTICAL   TWO ARM VERTICAL

TOTAL SCORE: 0.00

| TYPE | FORCE (in pounds) | COUNT/DAY | SCORE |
|---|---|---|---|
| ▼ | | | |
| ▼ | | | |
| ▼ | | | |
| ▼ | | | |
| ▼ | | | |
| ▼ | | | |
| ▼ | | | |
| ▼ | | | |

| 5) BENDING | | | TOTAL SCORE 0.00 |
|---|---|---|---|
| How many times is the torso bent forward greater than 45° during this IP? (Total Count) | | 0.00 | |
| How long is the torso bent forward greater than 45° during this IP? (Total Minutes) | | 0.00 | |

| 6) KNEELING | | | TOTAL SCORE 0.00 |
|---|---|---|---|
| How long is kneeling required during this IP? (Total Minutes) | | 0.00 | |

Figure 4

METHOD FOR MANAGING ERGONOMIC RISK EXPOSURE IN MANUFACTURING

BACKGROUND OF THE INVENTION

1. Field of the Invention

This invention relates generally to ergonomics risk management and, more specifically, to a process to manage ergonomics risks from early in product development throughout its manufacturing lifecycle.

2. Background of the Invention

In general, the majority of the injuries that occur in the manufacturing of large products such as vehicles, aircraft, and the like are associated with exposure to ergonomics risk factors. Epidemiologic research shows that prolonged exposures to such risks are causal factors that contribute to the onset of work related musculoskeletal disorders. Mitigation efficacy is particularly confounded by product size, shape, and configuration constraints.

Although industry standards exist to control the exposure to ergonomics risk factors, attempts to apply them by manufacturers have generally proven ineffective. As a direct result, costs of operations are negatively impacted by reduced worker productivity and product quality, and increased incident of injuries. Furthermore, inherent variation in task sequencing and process cycle times make evaluating ergonomics risks complex in larger scale manufacturing processes. Similarly, standardizing safe work practices is difficult to achieve.

Designing large structures and components for ease of assembly and manufacturing ergonomics is difficult when cost targets, product performance constraints, and the time intervals that exist between new product development initiatives are considered. It is important therefore, to leverage opportunities early in a product development cycle, to reduce the potential for injuries in production operations from exposure to ergonomics risk factors.

Ergonomic risk management during manufacturing typically manifests itself in the post production phase. Unfortunately, a majority of changes that occur during manufacturing to combat ergonomics risks are in response to the chronic existence of shop floor injuries. After manufacturing begins, changes to design or major factory tooling are very expensive and not likely to be considered as a means to improve manufacturing ergonomics. More commonly, ergonomic fixes in manufacturing take the form of ancillary tooling and production support equipment designed to assist with assembly processes. The aforementioned fixes, while often easy to implement, address in general only a portion of known ergonomic risks. The bulk of the ergonomic risks found in large scale manufacturing (e.g., prolonged awkward body postures, repetitive use of power tools, forceful exertions, etc.) are neither effectively addressed during the design phase nor managed well during manufacturing.

Therefore, a need exists for a methodology to manage ergonomic risks. The methodology needs to manage ergonomic risks from early in the development program throughout its manifestation as a sustained manufacturing operation.

SUMMARY OF THE INVENTION

A computer system comprising a processor and a user interface for assisting a user to plan operational tasks of a workplace, the computer system being capable of receiving and storing data related to at least one task of the workplace entered by the user through the user interface, the computer system having functionality to generate an ergonomic risk score for each task, determine if the ergonomic risk score is acceptable, provide option to the user to continue planning if the ergonomic risk score is acceptable, and provide option to the user to redesign at least a portion of the plan if the ergonomic risk score is not acceptable.

A method of planning an operational task of a workplace comprising: collecting data related to at least one task; generating an ergonomic risk score of each task; determining if the ergonomic risk score is acceptable; providing option to a user to proceed with the plan if the ergonomic risk score is acceptable; and providing option to the user to redesign at least a portion of the plan.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 3 is a first table showing an ergonomic risk checklist;

FIG. 4 is a second table showing an ergonomic risk checklist; and

DETAILED DESCRIPTION OF THE PREFERRED EMBODIMENTS

The disclosure is for planning operational tasks of a workplace. More specifically, the disclosure is an innovative process to manage ergonomic risks from early in product development throughout its manufacturing lifecycle. The methodology provides tools that analyze risk factors in design, assigns quantitative scoring to individual job elements within those designs, presents mitigation strategies for high risk tasks, provides data to shop floor information systems that enable ergonomic risks management through production scheduling and work assignment schemes, and monitors risk metrics in sustained manufacturing operations for feedback into continuous improvement processes.

An embodiment of the method provides designers with a convenient, integrated process to evaluate manufacturing ergonomics early in a product development phase. It is during this time that changes and enhancements are the least expensive to achieve. If new product designs incorporate features that address their eventual manufacturability, one can expect returns in the form of increased productivity, quality and reduced potential for injuries and work disruption. For ergonomic risks that are not feasible to "engineer-out" in design (e.g., constrained by shape, weight, cost, lack of appropriate technology, etc.), evaluation data are carried forward to the manufacturing phase to enable control through administrative means (e.g., job rotation, job expansion, staggered breaks, etc.). This method permits these data to be updated to reflect process changes as a result of improvements, variation in production schedules, or in response to workplace injury statistics.

Furthermore, by focusing on production ergonomics in the product development phase, designers are provided with a life-cycle methodology for addressing ergonomic risks concurrently with those responsible for designing associated manufacturing, service and maintenance processes.

Figure 1:
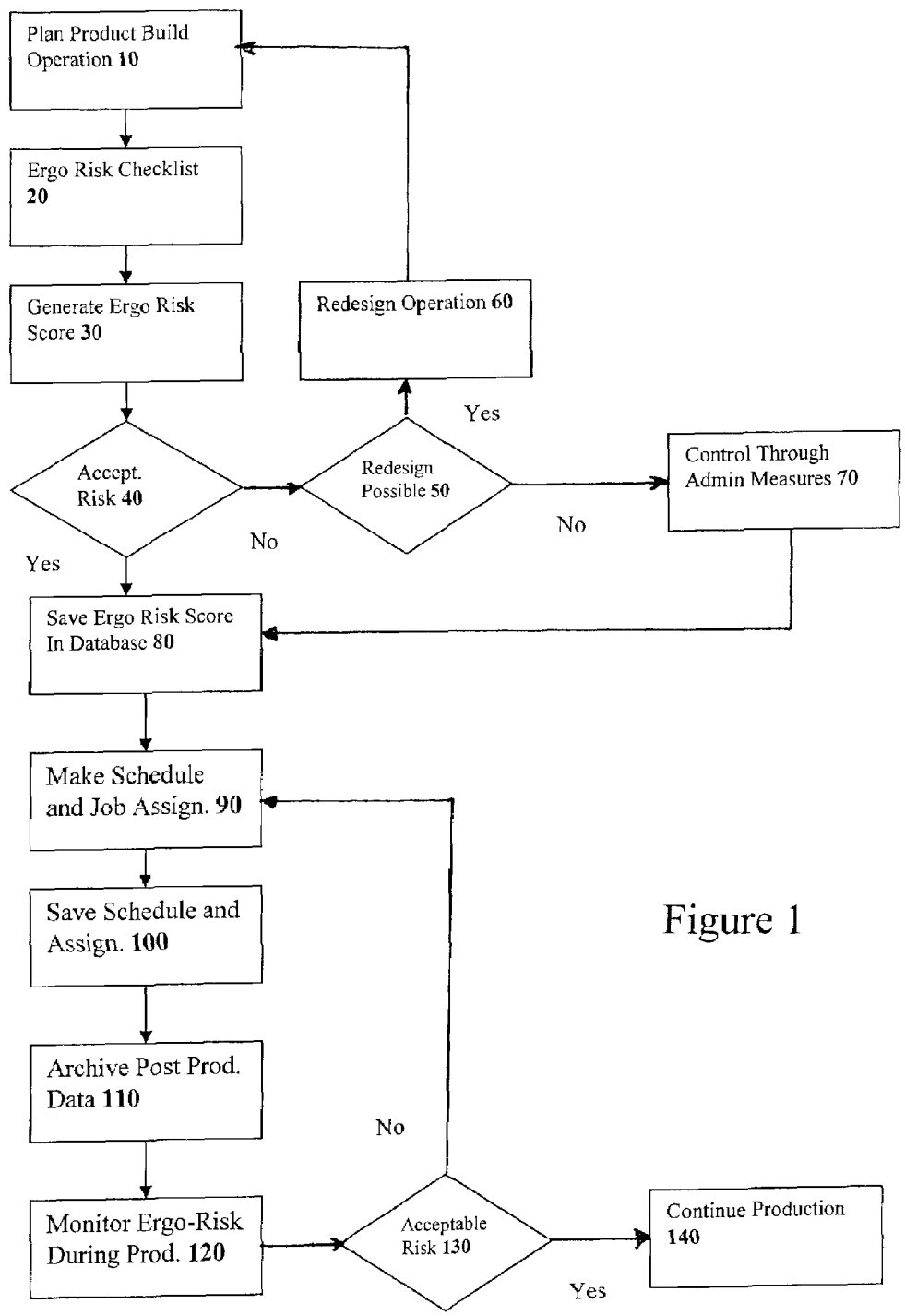
FIG. 1 is a process flow diagram showing a method for managing ergonomic risk exposure during manufacturing.

Referring to FIG. 1, a process flow diagram showing a method to manage ergonomic risks from early in product development throughout its manufacturing lifecycle is shown. During the design phase of the product, the design is divided into a plurality of build operation jobs 10. Build operation jobs will include jobs where there could possibly be ergonomic risk involved. Ergonomic risk would entail any job where there is a possibility of developing a work-related musculoskeletal disorder.

For each build operation job where there could possibly be ergonomic risk involved, an ergonomic risk assessment is performed 20. An ergonomic risk assessment 20 is an evaluation of the factors within a job that increase the chances of someone suffering an ergonomic injury. An ergonomic risk assessment 20 evaluates the stresses on the muscles, bones, ligaments, tendons, and nerves of a worker's body to determine if there is a risk of developing a work-related musculoskeletal disorder.

The ergonomic risk assessment 20 is performed by entering ergonomic data related to each build operation job. Common ergonomic risks are associated with factors such as: lifting, hand/arm stress, working overhead, pushing/pulling, bending, and kneeling. It should be noted that these risks are given as examples. Application of this method should be based on the type of work being performed and the historically documented ergonomic risks and injury statistics associated with a given work if historical data is available. Data related to each build operation job and each category is recorded. For example, one may record that a particular job requires a person to pull-up on an object up to one's knee with a force of twenty-five pounds one time each work session.

Figure 5:
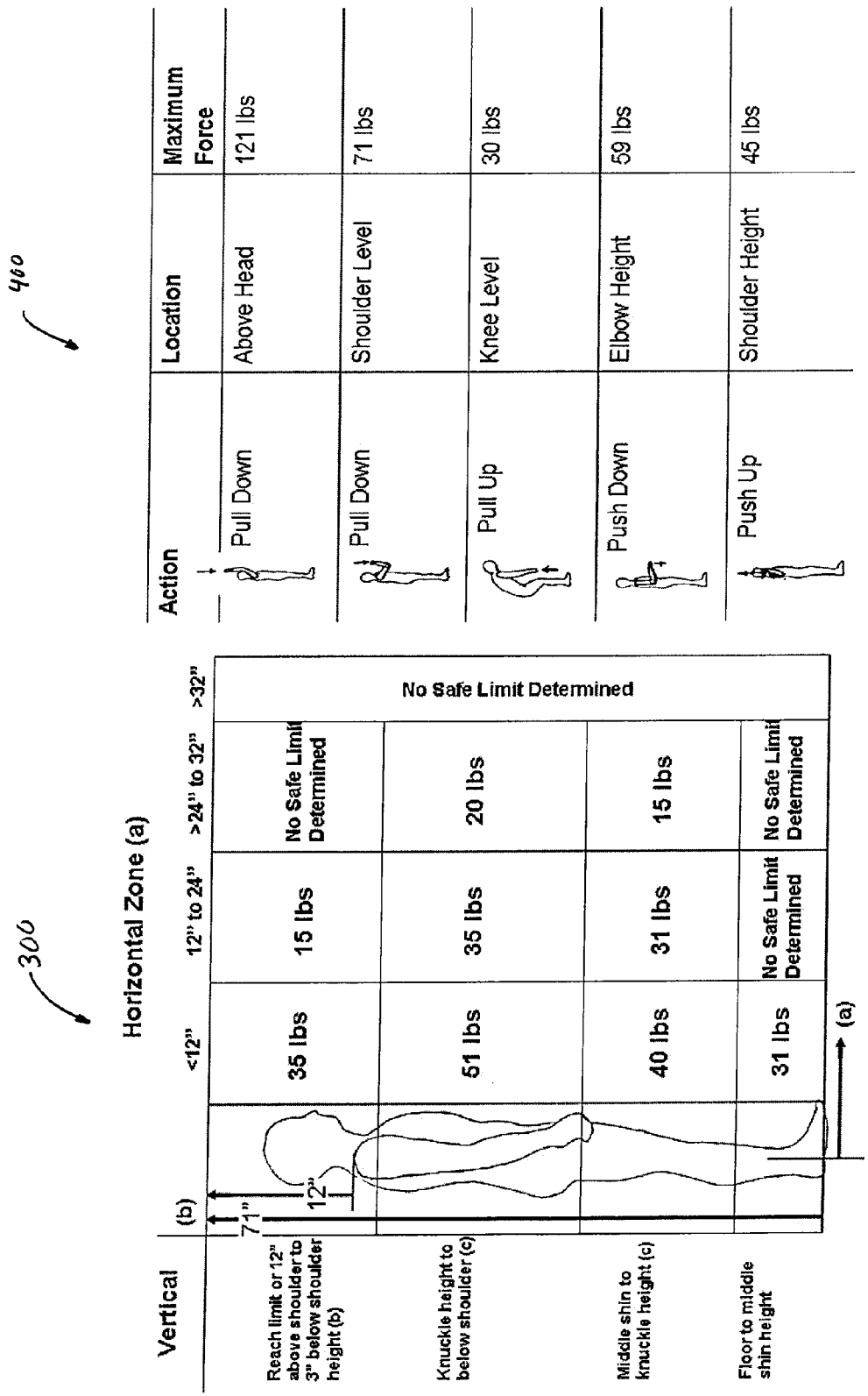
FIG. 5 is a table showing quantitative ergonomic risk factor standards.

Once the ergonomic risk assessment 20 is completed, the ergonomic risk assessment 20 will generate an ergonomic risk score 30. The ergonomic risk score 30 will generally be a numeric value which will indicate the likelihood of an individual developing a work-related musculoskeletal disorder from that particular build operation job. For example, each job may receive an incremental numeric value between 0 and 1.0. Zero would mean no ergonomic risk while a value of 1.0 would indicate extreme ergonomic risk. Thus, the higher the generated score 30, the higher the risk of a work-related musculoskeletal disorder. The ergonomic risk score will be based on industrially accepted ergonomic risk factor standards 300 and 400 such as those shown in FIG. 5, historical production data if available, and the like. It should be noted that the ergonomic risk factor standards 300 and 400 such as those shown in FIG. 5 are examples and should not be seen as to limit the scope of the present invention. Thus, for example where a particular job requires a person to pull-up on an object up to one's knee with a force of twenty-five pounds one time each work session, this is within industry standards and would generated an ergonomic risk score 30 indicating small ergonomic risk.

After an ergonomic score 30 is generated, a determination is made as to whether the ergonomic score 30 is an acceptable ergonomic risk 40. In general, a predetermined numeric value may be used to determine an acceptable ergonomic risk 40. For example, any score equal to or greater than a numeric value of 1.0 would be considered an unacceptable ergonomic risk. The listing of the above numeric value is given as an example and should not be seen as to limit the scope of the present invention.

If the ergonomic score 30 is not an acceptable ergonomic risk 40, a determination is made as to whether redesign is possible 50. If redesign is a possibility, the product or process will go through a redesign operation 60. The redesign operation 60 may require a complete redesign of the product or a redesign of the particular build operation process that has an unacceptable ergonomic risk determination 40.

For ergonomic risks that are feasible to redesign, once a redesign operation 60 is complete, the new product design is divided into a plurality of new build operation jobs 10. Each new build operation job will then have a new ergonomic risk assessment performed 20. The new risk assessment will generate new ergonomic scores 30 which will be evaluated as to whether the new ergonomic scores 30 have acceptable ergonomic risk levels 40.

For ergonomic risks that are not feasible to redesign (e.g., constrained by shape, weight, cost, lack of appropriate technology, etc.), the ergonomic risk data are carried forward to the manufacturing phase to enable control through administrative means (e.g., job rotation, job expansion, staggered breaks, etc.) 70. This data is updated to reflect process changes as a result of improvements, variation in production schedules or in response to workplace injury statistics.

After a build job is determined to have an acceptable ergonomic risk 40, the ergonomic score generated 30 is stored in a database 80. A production schedule 90 is generated having all job assignments and job priorities. This production schedule 90 is generally stored in a database 100 for future analysis. Once manufacturing begins, job planners will use the stored ergonomic risk data associated with each job element to create work assignment schedules for production personnel. This capability ensure a means to monitor and control any risks that may be created by scheduling work in a fashion that exposes a worker to an accumulated ergonomics risk condition that may exceed the predetermined daily threshold limits for an individual worker. This enables a systematic method for deploying job assignment strategies to proactively control ergonomics risks and corollary outcomes in production (e.g., fatigue, mistakes, poor quality and injury). The system is iterative in that daily accumulations of ergonomics risks are tracked by individual worker as job assignment decisions are made throughout a production day.

Additionally, post production data will be archived 110 for forensic purposes to analyze risk to injury correlation, make adjustments in job assignments, and to determine relationships between ergonomic risks and flow, productivity, quality.

As stated above, during production, each job is monitored for ergonomic risk exposure 120. For example, one can monitor to see if workers performing a particular job are experiencing excessive fatigue, mistakes, poor quality, injury, etc. A determination 130 is then made as to whether the monitored ergonomic risk exposure 120 is acceptable. If the ergonomic risk exposure is determined to be excessive, the job is re-planned 90. If the ergonomics risk exposure is determined not to be excessive, production 140 continues as is.

Figure 2:
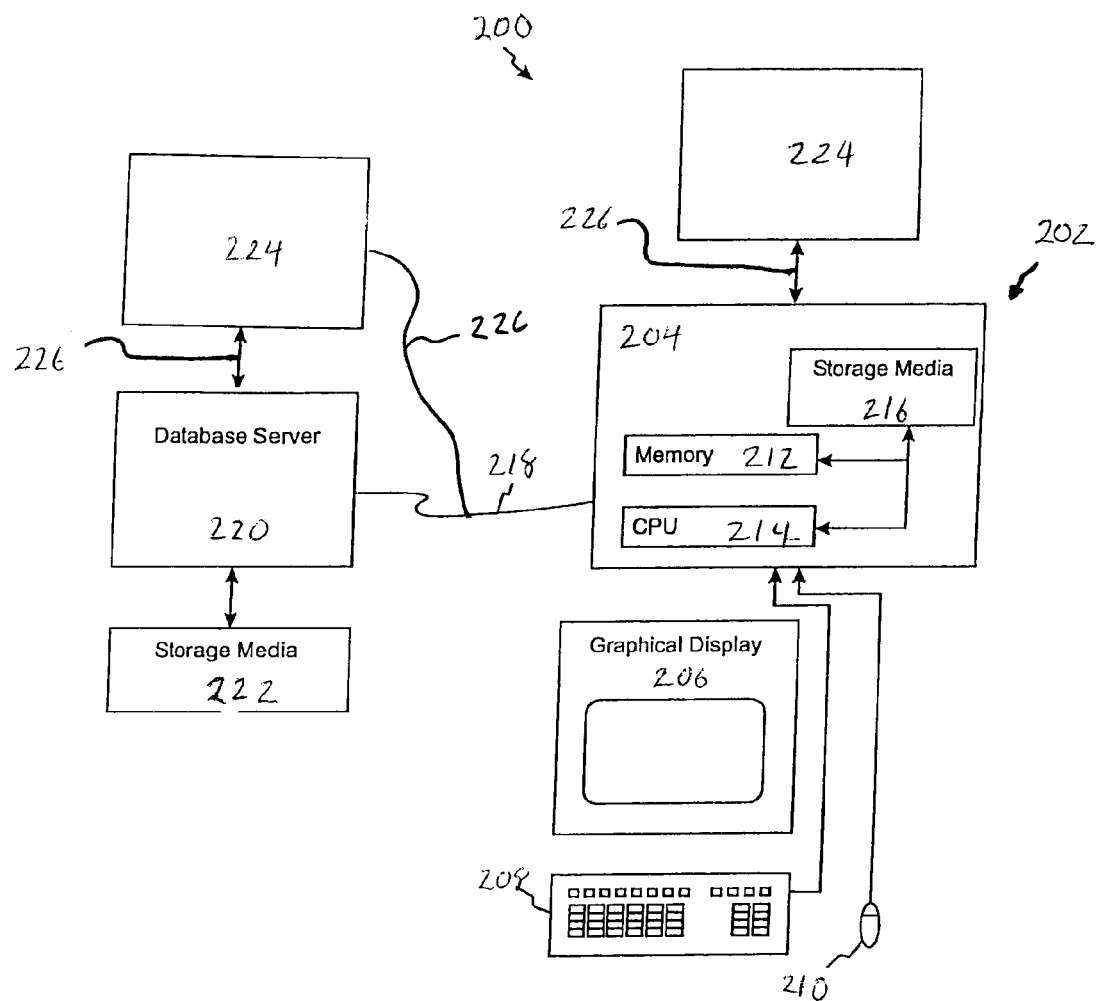
FIG. 2 is a simplified block diagram of a system for managing ergonomic risks.

Referring to FIG. 2, a system 200 to manage ergonomic risks from early in product development throughout its manufacturing lifecycle is shown. The system 200 generally uses a main computer system 202. The computer system 202 will have a processor unit 204 and a display 206. Input devices are coupled to the processor unit 204. The input devices may be a keyboard 208, a mouse 210 and the like.

Alternatively, the computer system 200 may have a connection 218 to a network such as a local-area network (LAN), wide-area network (WAN) or the Internet. The connection 218 may be a wired connection, a wireless connection, or the like. Any data stored may be stored in a storage media 222 coupled to the database server 220.

One or more outside computers 224 may be coupled to the main computer system 200. The connection 226 may be via a local-area network (LAN), wide-area network (WAN) or the Internet. The connection 226 may be a wired connection, a wireless connection, or the like. The outside computers 224 will have access to the main computer system 200 and/or the database server 220. The outside computers 224 will allow another party to perform ergonomics risk studies on the main computer system 200 and/or the database server 220.

In order to perform an ergonomic risk assessment, users will pull-up an ergonomic risk checklist 230 on the computer system 200. One embodiment of an ergonomic risk checklist 230 is shown in FIGS. 3 and 4. The checklist 230 is given as an example and should not be seen as to limit the scope of the present invention. Different checklists 230 may be develop for different jobs being performed. The ergonomic checklist 230 will evaluate ergonomic risks in different key areas. For this example, most of the company's ergonomic risks are associated with one of the following: lifting, hand/arm stress, working overhead, pushing/pulling, bending, and kneeling. It should be noted that the listed areas are given as examples and could be expanded based on the type of job being performed.

As shown in FIGS. 3 and 4, the ergonomic checklist 230 has an information area 232. The information area 231 is where data about a particular job is to be entered. This information may include but is not limited to: job number, job duration, project number, number of people for the job, etc.

The ergonomic checklist 230 is divided into the different ergonomic risk categories listed above: lifting 232, hand/arm stress 234, working overhead 236, pushing/pulling 238, bending 240, and kneeling 242. Each section is divided into a plurality of input areas. Data related to each job function will be inputted into an appropriate category and into an appropriate input area.

In the lifting category 232, input areas are provided for a lifting zone 232A, weight 232B, count 232C, ergonomic risk score 232D and total ergonomic risk score 232E. The lifting zone 232A will have a pull-down menu that allows a user to select which lifting zone a person will use in performing each desired task. In general, there will be three lifting zones: primary, modified primary, and modified secondary. A user will enter for each lifting task for a particular job the lifting zone used, the amount of weight lifted each time, and the number of times the weight has to be lifted. An ergonomic risk score 232D will be generated for each lifting task as well as a total ergonomic risk lifting score 232E which is the added value of all the ergonomic risk scores 232D. The ergonomic risk scores 232D will be based on ergonomic risk factor standards such as those shown in FIG. 5, historical production data like that saved in the database as described above, and the like.

In the hand/arm category 234, input areas are provided for grip type 234A, force 234B, count 234C, ergonomic risk score 234D, and total ergonomic risk score 234E. The grip type 234A will have a pull-down menu that allows a user to select which grip a person will use in performing each desired hand/arm task. In general, there will be four grips: hand grip, pinch grip, finger press, and thumb press. A user will enter for each hand/arm task for a particular job the grip used, the amount of force applied each time, and the number of times the force is applied. An ergonomic risk score 234D will be generated for each hand/arm task as well as a total ergonomic risk hand/arm score 234E which is the added value of all the ergonomic risk scores 234D. The ergonomic risk scores 234D will be based on ergonomic risk factor standards similar to those shown in FIG. 5, historical production data like that saved in the database as described above, and the like.

In the overhead category 236, input areas are provided for the number of times the hands are raised above the head 236A, an ergonomic score 236B associated with the number of times the hands are raised above the head, the total amount of time the hands are raised above the head 236C, an ergonomic risk score 236D associated with the total amount of time the hands are raised above the head, and a total ergonomic risk overhead score 236E which is the added value of all the ergonomic risk scores 236B and 236D. The ergonomic risk scores 236B and 236D will be based on ergonomic risk factor standards similar to those shown in FIG. 5, historical production data like that saved in the database as described above, and the like.

In the push/pull category 238, columns are provided for push/pull type 238A, force 238B, count 238C, ergonomic risk score 238D and a total ergonomic risk score 238E. The push/pull type 238A will have a pull-down menu that allows a user to select which push/pull type a person will use in performing each desired push/pull task. In general, there will be four push/pull types: two hand horizontal push/pull, one handed horizontal push/pull, one arm vertical push/pull, and two arm vertical push/pull. A user will enter for each push/pull task for a particular job the push/pull type used, the amount of force applied each time, and the number of times the force is applied in the appropriate input areas. An ergonomic risk score 238D will be generated for each push/pull task as well as a total ergonomic risk push/pull score 238E which is the added value of all the ergonomic risk scores 238D. The ergonomic risk scores 238D will be based on ergonomic risk factor standards similar to those shown in FIG. 5, historical production data like that saved in the database as described above, and the like.

In the bending category 240, input areas are provided for the number of times the torso is bent forward greater than 45° 240A, an ergonomic score 240B for the number of times the torso is bent forward greater than 45°, the total amount of time the torso is bent forward greater than 45° 240C, an ergonomic risk score 240D for the total amount of time the torso is bent forward greater than 45°, and a total ergonomic risk bending score 240E which is the added value of all the ergonomic risk scores 240B and 240D. The ergonomic risk scores 240B and 240D will be based on ergonomic risk factor standards similar to those shown in FIG. 5, historical production data like that saved in the database as described above, and the like.

In the kneeling category 242, input areas are provided for the total amount of time kneeling is required 242A, an ergonomic risk score 242B for the total amount of time kneeling is required, and a total ergonomic risk kneeling score 240C which is generally the value of the ergonomic risk score 242B. The ergonomic risk score 242B will be based on ergonomic risk factor standards similar to those shown in FIG. 5, historical production data like that saved in the database as described above, and the like.

Once data is entered, a total ergonomic risk score will be generated in each category. Design teams consisting of Manufacturing Engineers (ME's) and Design Engineers (DE's) will identify and quantify the level of ergonomic risk inherent in each individual job/plan. ME's will enter the ergonomic risk scores into production definition software. Ergonomic scores will thus be available to support administrative controls of ergonomics risks in manufacturing.

A constraint based production schedule is generated having all job assignments and job priorities. This production schedule is generally stored in a database of the computer system 200 for future analysis. Once manufacturing begins, job planners will use the stored ergonomics risk data associated with each job element to create work assignment schedules for production personnel. This capability addresses the risks of overexposing workers to daily threshold limits and enables a systematic method for deploying job assignment strategies to proactively control ergonomics risks and corollary outcomes in production (e.g., fatigue, mistakes, poor quality and injury). The system is iterative in that daily accumulations of ergonomics risks are tracked by individual worker as job assignment decisions are made throughout a production day.

Additionally, post production data will be archived in the computer system 200 for forensic purposes to analyze risk to injury correlation, make adjustments in job assignments, and to determine relationships between ergonomic risks and flow, productivity, quality.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A computer system comprising a processor and a user interface configured to assist a user to plan operational tasks of a workplace, the computer system receiving and storing data related to at least one task of the workplace entered by the user through the user interface, the computer system having functionality to generate an ergonomic risk score for each task, determine if the ergonomic risk score is acceptable, provide option to the user to continue planning if the ergonomic risk score is acceptable, and provide option to the user to redesign at least a portion of the plan if the ergonomic risk score is not acceptable.

2. The computer system of claim 1 wherein the workplace is a manufacturing environment.

3. The computer system of claim 2 wherein the at least one task is related to production of a product.

4. The computer system of claim 3 wherein the option to the user to redesign at least a portion of the plan is to redesign the product.

5. The computer system of claim 3 wherein the option to the user to redesign at least a portion of the plan is to redesign the at least one task.

6. The computer system of claim 1 wherein the workplace is an environment requiring physical activities.

7. The computer system of claim 1 entering data related to lifting, hand or arm stress, working overhead, pushing or pulling, bending, and kneeling associated with each task.

8. A computer system comprising a processor and a user interface configured to assist a user to plan operation tasks of a workplace, the computer system receiving ergonomic risk data related to a task; generating an ergonomic risk score for the task; determining if the ergonomic risk score is acceptable; storing the ergonomics risk score associated with the task and proceeding with production if the ergonomic risk score is acceptable; redesign of the task if the ergonomic risk score is unacceptable; and generating a production schedule having job assignments and job priorities based on acceptable ergonomics risk score.

9. The computer system of claim 8 further comprising dividing a construction project into a plurality of tasks.

10. The computer system of claim 8 further comprising:
    tracking daily accumulations of ergonomics risks by individual workers on the task during production;
    entering and storing the daily accumulations of ergonomics risks by individual workers on the task during production in a computer program; and
    making adjustments in job assignments based on the stored daily accumulations of ergonomics risks by individual workers.

11. The computer system of claim 8 wherein entering ergonomic risk data associated with the task comprises entering data related to lifting, hand or arm stress, working overhead, pushing or pulling, bending, and kneeling associated with the task.

12. A computer implemented method of planning an operational task of a workplace, the computer:
    collecting data related to at least one task;
    generating an ergonomic risk score of each task;
    determining if the ergonomic risk score is acceptable;
    providing option to a user to proceed with the plan if the ergonomic risk score is acceptable; and
    providing option to the user to redesign at least a portion of the plan if the ergonomic risk score is unacceptable.

13. The method of claim 12 further comprising dividing a construction project into a plurality of tasks.

14. The method of claim 12 further comprising:
    storing the ergonomics risk score associated with each task; and
    generating a production schedule having job assignments and job priorities based on the ergonomics risk scores.

15. The method of claim 14 further comprising:
    tracking daily accumulations of ergonomics risks by individual workers on each task during production;
    entering and storing the daily accumulations of ergonomics risks by individual workers on each task during production in a computer program; and
    making adjustments in job assignments based on the stored daily accumulations of ergonomics risks by individual workers.

16. The method of claim 12 wherein entering data related to a task further comprises entering ergonomic risk data associated with the task.

17. The method of claim 16 wherein entering ergonomic risk data associated with the task comprises entering data related to lifting, hand or arm stress, working overhead, pushing or pulling, bending, and kneeling associated with the task.

18. The method of claim 12 further comprising:
    entering data related to a redesigned task;
    generating an ergonomic risk score of the redesigned task;
    determining if the ergonomic risk score of the redesigned task is acceptable;
    proceeding with production if the ergonomic risk score of the redesigned task is acceptable; and
    redesign of the task if the ergonomic risk score of the redesigned task is unacceptable.

* * * * *